(12) United States Patent
Moriconi et al.

(10) Patent No.: US 12,536,687 B2
(45) Date of Patent: Jan. 27, 2026

(54) APPARATUS AND METHOD FOR IMAGE PROCESSING

(71) Applicants: King's College London, London (GB); UCL Business Ltd, London (GB)

(72) Inventors: Stefano Moriconi, London (GB); Manuel Jorge Machado Cardoso, London (GB); Parashkev Nachev, London (GB); Sebastien Ourselin, London (GB)

(73) Assignees: King's College London, London (GB); UCL Business Ltd, London (GB)

( * ) Notice: Subject to any disclaimer, the term of this patent is extended or adjusted under 35 U.S.C. 154(b) by 195 days.

(21) Appl. No.: 17/904,105

(22) PCT Filed: Feb. 12, 2021

(86) PCT No.: PCT/GB2021/050349
§ 371 (c)(1),
(2) Date: Aug. 11, 2022

(87) PCT Pub. No.: WO2021/161038
PCT Pub. Date: Aug. 19, 2021

(65) Prior Publication Data
US 2023/0106527 A1     Apr. 6, 2023

(30) Foreign Application Priority Data
Feb. 12, 2020   (GB) ..................................... 2001914

(51) Int. Cl.
*G06T 7/62*    (2017.01)
*G06T 7/00*    (2017.01)
*G06T 17/10*   (2006.01)

(52) U.S. Cl.
CPC .............. *G06T 7/62* (2017.01); *G06T 7/0012* (2013.01); *G06T 17/10* (2013.01); *G06T 2207/30101* (2013.01); *G06T 2210/41* (2013.01)

(58) Field of Classification Search
CPC ........... G06T 7/62; G06T 7/0012; G06T 7/10; G06T 2207/30101; G06T 2210/41
See application file for complete search history.

(56) References Cited

U.S. PATENT DOCUMENTS 6,201,543 B1 *   3/2001   O'Donnell ................ G06T 7/12
                                                           345/423
2008/0085042 A1   4/2008   Trofimov et al.
(Continued)

FOREIGN PATENT DOCUMENTS

EP           3477592 A1    5/2019
KR     10-2016-0053325 A   5/2016
(Continued)

OTHER PUBLICATIONS

International Search Report and Written Opinion for International Application No. PCT/GB2021/050349, entitled Apparatus and Method for Image Processing, consisting of 12 pages. Date Mailed May 11, 2021.
(Continued)

*Primary Examiner* — John J Lee
(74) *Attorney, Agent, or Firm* — Hamilton, Brook, Smith & Reynolds, P.C.

(57) ABSTRACT

Examples of the present disclosure relate to an apparatus comprising input circuitry configured to acquire imaging data corresponding to a branched organic structure, and image processing circuitry. The image processing circuitry is configured to determine, from the imaging data, a parametric configuration of the branched organic structure comprising solid and volumetric scaffolding data indicative of the
(Continued)

branched organic structure, and determine, based on the scaffolding data, a multi-dimensional parametric representation of the branched organic structure.

18 Claims, 10 Drawing Sheets

(56) References Cited

U.S. PATENT DOCUMENTS

| | | | |
|---|---|---|---|
| 2011/0093243 A1* | 4/2011 | Tawhai | G06T 7/0012 |
| | | | 703/2 |
| 2014/0379318 A1* | 12/2014 | Spilker | G06T 7/11 |
| | | | 703/11 |
| 2015/0164452 A1 | 6/2015 | Choi et al. | |
| 2015/0164453 A1 | 6/2015 | Choi et al. | |
| 2016/0008085 A1 | 1/2016 | Itai | |
| 2016/0300350 A1* | 10/2016 | Choi | G16Z 99/00 |
| 2017/0178226 A1 | 6/2017 | Graham et al. | |
| 2017/0270705 A1 | 9/2017 | Hopfgartner et al. | |
| 2019/0023060 A1 | 1/2019 | Maertens et al. | |
| 2023/0079772 A1 | 3/2023 | Moriconi et al. | |

FOREIGN PATENT DOCUMENTS

| | | |
|---|---|---|
| WO | 2009050304 A1 | 4/2009 |
| WO | 2009064715 A1 | 5/2009 |
| WO | 20170178226 A1 | 10/2017 |
| WO | 2021064372 A1 | 4/2021 |

OTHER PUBLICATIONS

Kiousis, D., E., et al.: "A Numerical Model to Study the Interaction of Vascular Stents with Human Atherosclerotic Lesions", Annals of Biomedical Engineering, Kluwer Academic Publishers-Plenum Publishers, NE, vol. 35, No. 11, (2007).
Leventon et al., "Statistical Shape Influence in Geodesic Active Contours," 5th IEEE EMBS International Summer School on Biomedical Imaging, 2002.
Cebral et al., "From medical images to anatomically accurate finite element grids", Int. J. Numer. Meth. Engng 2001; 51:985-1008 (Year: 2001).
"TubeTK, Segmentation, Registration, and Analysis of Images with Tubular Structures," Downloaded from https://web.archive.org/web/20120705040439/http://www.tubetk.org/ on Aug. 12, 2025, Kitware.
A. Kanitsar, et al., "Curved planar reformation," In Proc Conf Visual IEEE, 2002.
B. Urick, et al., "Review of patient-specific vascular modeling: template-based iso-geometric framework and the case for CAD," Arch Comput Methods Eng, 2019; 26:381-404. Published on line Nov. 28, 2017.
C. Chnafa, et al., "Improved reduced-order modelling of cerebrovascular flow distribution by accounting for arterial bifurcation pressure drops," J Biomech, 2017.
C. Mathers, et al., "The Global Burden of Disease," WHO, 2008.
C. Taylor and J. Humphrey, "Open problems in computational vascular biomechanics: Hemodynamics and arterial wall mechanics," CMAME, 2009.
D. Steinman, et al., "Computational modeling of arterial biomechanics: Insights into pathogenesis and treatment of vascular disease," J Vasc Surg, 2003.
E. Bullitt, "Healthy MR Database: Designed Database of MR Brain Images of Healthy Volunteers," ITK-TubeTK, 2007.
E. Konukoglu, et al., "A Recursive Anisotropic Fast Marching Approach to Reaction Diffusion Equation: Application to Tumor Growth Modeling," In IPMI, 2007.
F. E. Fossan, et al., "Optimization of opological complexity for one-dimensional arterial blood flow models," J Royal Soc Interface, 2018.
J. A. Sethian, "A Fast Marching Level Set Method for Monotonically Advancing Fronts," PNAS, 1996.
J. R. Cebral, et al., "Characterization of cerebral aneurysms for assessing risk of rupture by using patient-specific computational hemodynamics models," Am J Neuroradiol, 2005.
J. Ryu, et al., "A coupled lumped-parameter and distributed network model for cerebral pulse-wave hemodynamics," J Biomech Eng, 2015.
L. Antiga and D. Steinman. The Vascular Modeling Toolkit. URL:http://www.vmtk.org, 2008.
L. Antiga, et al. AneuriskWeb, The Aneurisk Dataset Repository. URL:http://ecm2.mathcs.emory.edu/aneuriskweb/, 2011.
M. D. Vitturi, "Navier-Stokes equations in cylindrical coordinates," 2016.
M. Shojima, et al., "Magnitude and role of wall shear stress on cerebral aneurysm: computational fluid dynamic study of 20 MCA aneurysms," Stroke, 2004.
O. Onaizah, et al., "A model of blood supply to the brain via the carotid arteries: Effects of obstructive vs. sclerotic changes, " Med Eng Phys, 2017.
R. Kwitt, et al., "Studying Cerebral Vasculature Using Structure Proximity and Graph Kernels," In MICCAI, 2013.
S. Moriconi, et al., "Inference of cerebrovascular topology with geodesic minimum spanning trees," IEEE TMI, vol. 38, No. 1, Jan. 2019.

* cited by examiner (c)

(d)

APPARATUS AND METHOD FOR IMAGE PROCESSING

This application is the U.S. National Stage of International Application No. PCT/GB2021/050349, filed Feb. 12, 2021, which designates the U.S., published in English, and claims priority under 35 U.S.C. § 119 or 365(c) to Great Britain Application No. 2001914.7, filed Feb. 12, 2020. The entire teachings of the above applications are incorporated herein by reference.

The presented technique relates to the field of image processing. More particularly, it relates to determining parametric representations of branched organic structures based on imaging data. The organic structures may be biological structures.

The solid and volumetric extent of branched organic structures, such as networks of convoluted vessels (such as blood vessels), the neighbouring multi-layer wall of (in)homogeneous medium, the surrounding hollow and folded organs, and so on, can be extremely complex. This complex structure can be imaged using techniques such as angiography. However, the complexity can lead to difficulty in processing such images to detect physical characteristics of the imaged structures, for example relating to fluid flow within the structure, and to induced stress-strain to the neighbouring structures: even where the layout of such a structure can be determined, significant computing resources can be required to analyse the structure and determine physical characteristics (for example biological characteristics) thereof. Whilst the complexity can be reduced by analysing only a relatively small portion of a complex structure, such as for example the layout of blood vessels in a specific part of a brain as opposed to an entire neurovascular network, this limits the extent to which such a geometry of such a structure can be determined. This in turn limits the extent to which physical characteristics of such a structure can be accurately detected. For example, it may be difficult or impossible to accurately determine characteristics of one part of the organic structure without taking into account how that part interacts with the rest of the structure.

There is thus a desire for improved apparatus and methods for analysing imaging data, corresponding to branched organic structures, to determine parametric (and/or geometric) representations of such structures.

In one example configuration, there is provided an apparatus comprising:
input circuitry configured to acquire imaging data corresponding to a branched organic structure; and
image processing circuitry configured to:
determine, from the imaging data, a parametric configuration of the branched organic structure comprising solid and volumetric scaffolding data indicative of the branched organic structure;
determine, based on the scaffolding data, a multi-dimensional parametric representation of the branched organic structure.

In a further example configuration, there is provided a method comprising:
acquiring imaging data corresponding to a branched biological structure;
determining, from the imaging data, a parametric configuration of the branched organic structure comprising solid and volumetric scaffolding data indicative of the branched organic structure;
determining, based on the scaffolding data, a multi-dimensional parametric representation of the branched organic structure.

In a further example configuration, there is provided a computer-readable medium comprising computer-implementable instructions for causing a computer to become configured as the aforementioned apparatus, or to become configured to carry out the aforementioned method.

The present technique will be described further, by way of illustration only, with reference to examples thereof as illustrated in the accompanying drawings, in which:

FIG. 1 shows schematically an apparatus according to examples of the present disclosure.

FIGS. 2 to 4 schematically illustrate an example of determination of a parametric configuration of a branched organic structure comprising details at multiple scales of the solid, volumetric and vectorial scaffolding data.

FIG. 5 depicts an example of arbitrarily complex and irregular branching pattern parametrised using the scaffolding data and associated organic continuity.

FIG. 6 schematically illustrates a multi-dimensional parametric representation comprising physical characteristics of a branched organic structure, corresponding to a clinical set-up, according to an example.

Figure 1:
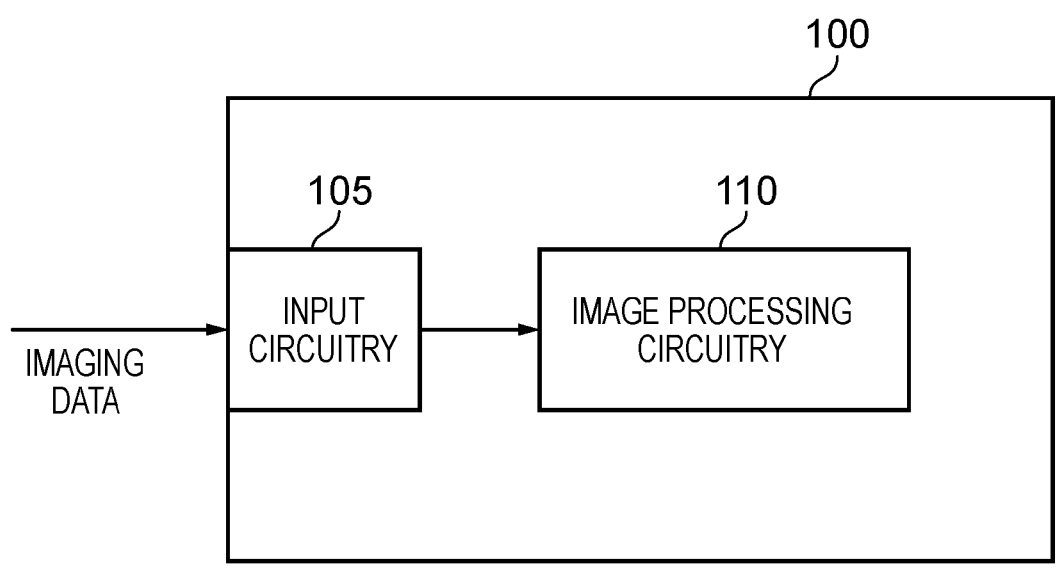

As stated above, an apparatus according to an aspect of the present disclosure comprises input circuitry configured to acquire imaging data corresponding to a branched organic structure. The branched organic structure may be a hollow convoluted (e.g. tubular) structure with organic shape comprising a fluid, such as a network of vessels for example within an organ such as a brain, kidney, eye or lung. The imaging data may be a two or three-dimensional image acquired by angiography or by computed tomography imaging, for example of the vessel structure of a human or animal organ. In other examples, the imaging data may be a multi-spectral and/or multi-dimensional representation, or another form of representation.

The apparatus comprises image processing circuitry. The image processing circuitry may be dedicated circuitry or general-purpose circuitry. For example, the image processing circuitry may be a computer processor such as a central processing unit (CPU) or graphical processing unit (GPU) executing computer instructions defining the following image processing steps. As another example, the image processing circuitry may be implemented in one or more application-specific integrated circuits (ASICs) or field-programmable gate arrays (FPGAs).

The image processing circuitry is configured to determine, from the imaging data, a parametric configuration of the branched organic structure.

The image processing circuitry is configured to determine solid scaffolding data indicative of the parametric configuration of the branched organic structure. The scaffolding data comprise an organised, consistent and structured plurality of conforming free-form vectorial elements associated with a volumetric region of the branched organic structure in the form of a continuum. These elements may be polygons associated with a surface of the branched structure, for example curvilinear non-planar polygons. A scaffold of such conforming free-form elements (for example, with each element sharing the same geometric and parametric expression and the same continuous physical characteristics, for example edges, with neighbouring elements) can thereby efficiently approximate a true volumetric representation of the branched organic structure with a minimal number of elements. At least one of said free-form vectorial elements of the scaffolding may optionally exhibit curvilinear profiles and curvilinear non-planar sides.

The image processing circuitry is configured to determine, based on the scaffolding data, a multi-dimensional parametric representation of the organic structure. The representation may for example be a dynamic or time-dependent (four-dimensional) representation. This representation may be a mathematical approximation of the organic structure's geometry, or its volumetric region or its physical property, for example a parametrically vectorial representation of the branched organic structure. Such a representation is efficient in terms of the processing resources to generate and store, as well as the processing resources to perform further processing based thereon (for example to model physical properties and behaviours of the branched organic structure), in particular when compared with the processing and storage resources that would be incurred in determining a complete representation of the geometry of the branched structure. However, such a representation is also more accurate than other, less detailed, methods of representation. This allows increased accuracy of results determined from the aforementioned further processing of the representation.

In an example, the determining of the scaffolding data by the image processing circuitry comprises imposing at least one of a solid continuity constraint and a smoothness constraint associated with adjacent elements of said plurality of free-form elements. This allows assurance that the scaffolding data will not have unexpected features (such as, for example, gaps and/or severe angles between elements which do not accurately represent features of the actual branched organic structure). This improves the accuracy of the geometric representation, and accordingly improves the accuracy of representation of the physical properties and behaviours of the branched organic structure.

In a particular example, the scaffolding data comprises Non-Uniform Rational B-Splines (NURBS), as well as hierarchical NURBS, and Trimmed-NURBS (T-NURBS) as vector primitives corresponding to branches, for example solid branches, of the branched organic structure and corresponding to connections between said branches of the branched organic structure. This provides a relatively accurate, and computationally efficient, way of charactering the volumetric physical space of the branched organic structure, as well as physical characteristics of the medium of the branched organic structure, for example in the form of a continuum. The NURBS primitives may comprise curvilinear free-form elements in the form of solid patches, defined over a three-dimensional, geometric and parametric domain.

In an example the image processing circuitry is configured to, as part of determining the scaffolding data, determine at least one geometrical property of each solid branch and at least a topological property of each connection of the branched organic structure. Examples of geometrical properties of a given branch include length, size and spatial location of that branch. Examples of topological properties of a given connection include a number of incident branches of that connection and the presence of neighbouring solid structures. The conforming scaffolding data can thus encapsulate both geometrical and topological descriptions of the branches and connections between branches and neighbouring solid structures, of the branched organic structure. Physical properties and behaviours of the structure can depend on the spatial and topological properties, and so accurately describing the conforming scaffolding data can allow accurate modelling of such physical properties and behaviours in a multi-dimensional parametric representation.

In some examples the image processing circuitry is configured to detect, based on the multi-dimensional parametric representation, a physical characteristic of the branched organic structure. The physical characteristic may for example be a biological indication of a resilience or susceptibility of the organic structure to damage. For example, where the organic structure is a vascular network of a human brain, the physical characteristic may be a biological index of resilience of the brain to a surgical modification thereof, or a susceptibility of the brain to an event such as a stroke. The image processing circuitry can thereby make use of the efficient representation of the organic structure to efficiently determine physical characteristics, using significantly less processing resources than would be used in comparative systems in which a less efficient representation of the biological structure is used. This allows the present apparatus to determine physical characteristics of significantly more complex organic structures than would be possible with some comparative systems that do not implement the present disclosure. For example, implementations of the present disclosure could analyse a complex structure such as a complete, or substantially complete, neurovascular network, whereas comparative systems in which a less efficient representation of the biological structure is used may be limited to (within a reasonable time) analysing smaller, i.e. incomplete, portions of such a biological structure. The present disclosure thus provides more accuracy in determination (i.e. by providing more accurate approximation) of physical characteristics of biological relevance. For example, the resilience of a organic structure to a surgical modification may depend on the layout of that structure in locations far from the modification, which may not be captured in an analysis of a mere portion of the structure.

The image processing circuitry may be configured to, as part of detecting the physical characteristic, determine a distribution of at least one (bio-)mechanical property such as a fluid property within the branched biological structure. Other example (bio-)mechanical properties include bio-visco-elasticity and (bio-)mechanical stress and/or deformation behaviours. Other example physical properties include thermal distribution and radiation transfer of the branched organic structure and neighbouring structures, for example induced by injected radionuclides as imaging contrast or therapeutic medium. Other example physical properties include the distribution of electro-magnetic field in the branched organic structure and neighbouring structures, for example due to exposure of external or internal sources of electro-magnetic fields.

Among the physical properties, examples of fluid properties include fluid pressure and fluid flow (for example flow rate). The image processing circuitry may determine the distribution of the at least one fluid property by performing computational fluid dynamic simulations based on the parametric representation of the branched organic structure. These fluid properties may for example be used in the aforementioned detection of physical characteristics of biological relevance. For example, the impact of a blockage in a given branch of the organic structure may depend on the pressure and flow at nearby inlets and outlets: the present apparatus can thus use these fluid properties to determine the susceptibility of an individual to such a blockage. This technique can be extended to determine the functional resilience of the individual to such a blockage in a number of scenarios.

As explained above, the multi-dimensional parametric representation of the branched organic structure is based on the scaffolding data. The representation can thus be evaluated on individual points, at any part of the branched organic structure, for example within its volumetric region or at its boundary; at a specific time-point or dynamically over a multi-dimensional profile. In some examples the representation comprises a multi-dimensional representation of an interior interface of the branched organic structure, and a multi-dimensional representation of an exterior interface of the branched organic structure. The representation can thus represent both the geometrical shape of the branched organic structure and its constituting physical medium, and thereby more accurately represent the whole structure and its behaviour. For example, some physical characteristics of the branched organic structure may depend on the non-uniform distribution of a physical property of the medium as a continuum. As an example, the resistance to deformation of the structure may increase with a continuously increased gradient of thickness or stiffness. The multi-dimensional representation can also represent a simulated scenario, where any of the parameters can be individually or jointly altered to simulate and predict downstream effects.

Examples of the present disclosure will now be described with reference to the Figures.

FIG. 1 shows schematically an apparatus 100 according to examples of the present disclosure.

The apparatus 100 comprises input circuitry 105. The input circuitry 105 is configured to acquire imaging data corresponding to a branched organic structure. This image data may for example be acquired from an image capture device, such as a medical imaging apparatus, or from a storage.

The apparatus 100 further comprises image processing circuitry 110. The image processing circuitry may comprise dedicated circuitry or, in other examples, may be implemented within general-purpose circuitry such as processing circuitry. Examples of general-purpose processing circuitry include a central processing unit and a graphical processing unit.

The image processing circuitry 110 is configured to extract, from the imaging data, a parametric configuration of the branched organic structure. The image processing circuitry is configured to then determine scaffolding data indicative of the configuration of the branched organic structure. Examples of how this determination can be performed are described in more detail below.

The image processing circuitry is configured to determine, based on the scaffolding data, a multi-dimensional parametric representation of the branched organic structure. Examples of determination of such a representation is described in more detail below.

FIGS. 2 to 6 schematically illustrate examples of determination of parametric configurations of branched organic structures comprising details at multiple scales of the solid and vectorial scaffolding data.

Figure 2:
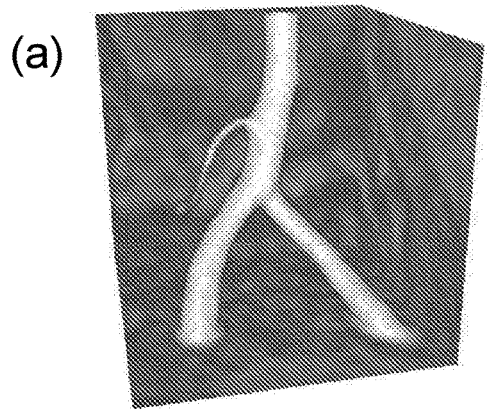
Figure 2:
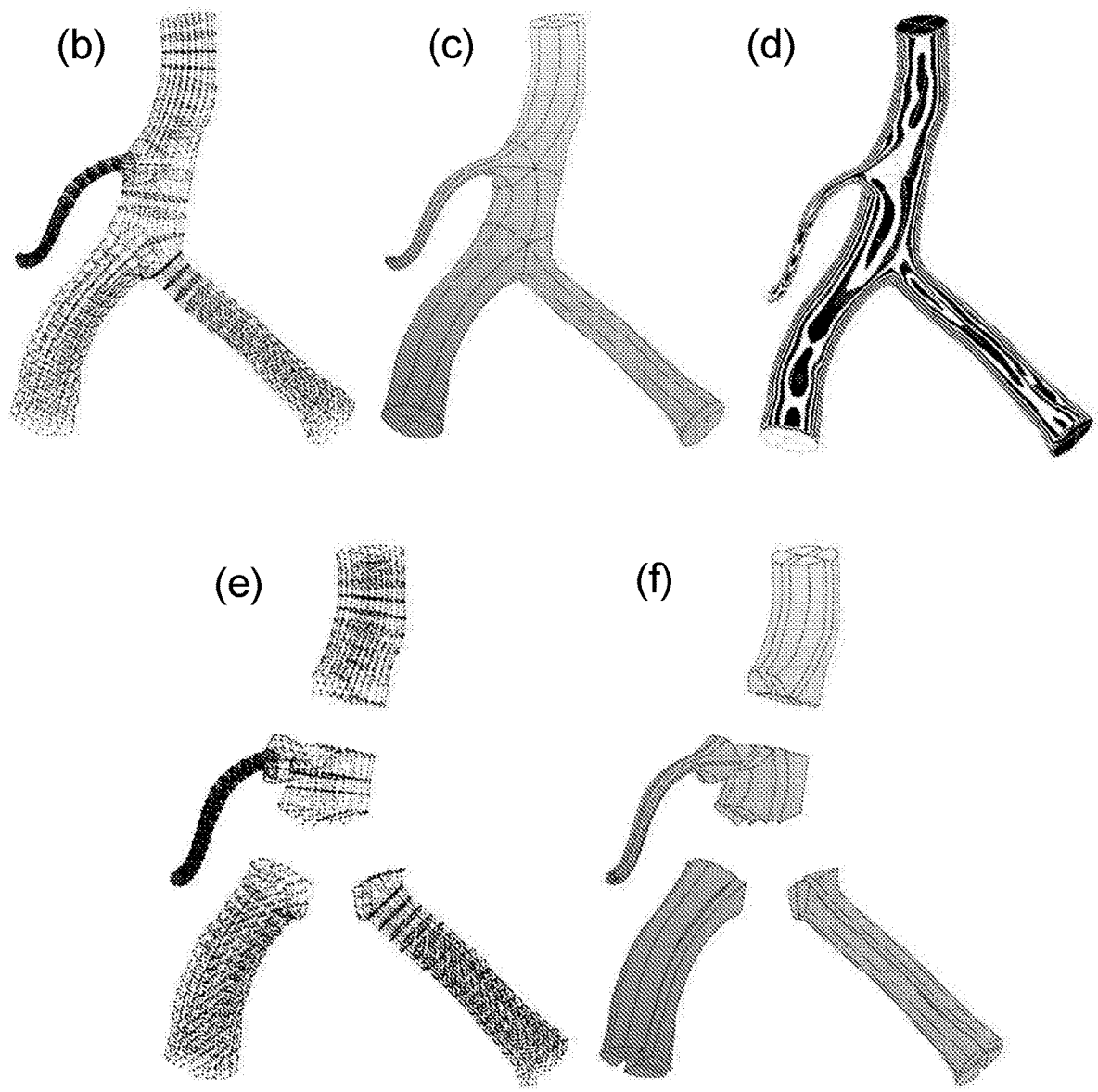

FIG. 2 schematically illustrates a branched organic structure 2a, for example as captured by an imaging apparatus. The solid scaffolding data associated to the luminal region of the branched organic structure is illustrated in an ensemble view 2b and in an explosion view 2e. The underlying vectorial and volumetric region is illustrated in an ensemble view 2c and in an explosion view 2f. Solid continuity and smoothness constraints are illustrated in the curvature view 2d where reflection lines show continuity on the boundary of the branched organic structure. The branched organic structure in FIG. 2 is shown as a relatively simple structure for ease of illustration of the plurality of scaffolding elements, but in some implementations could be a complex structure such as a large vascular network (for example a complete neurovascular network).

Figure 3:
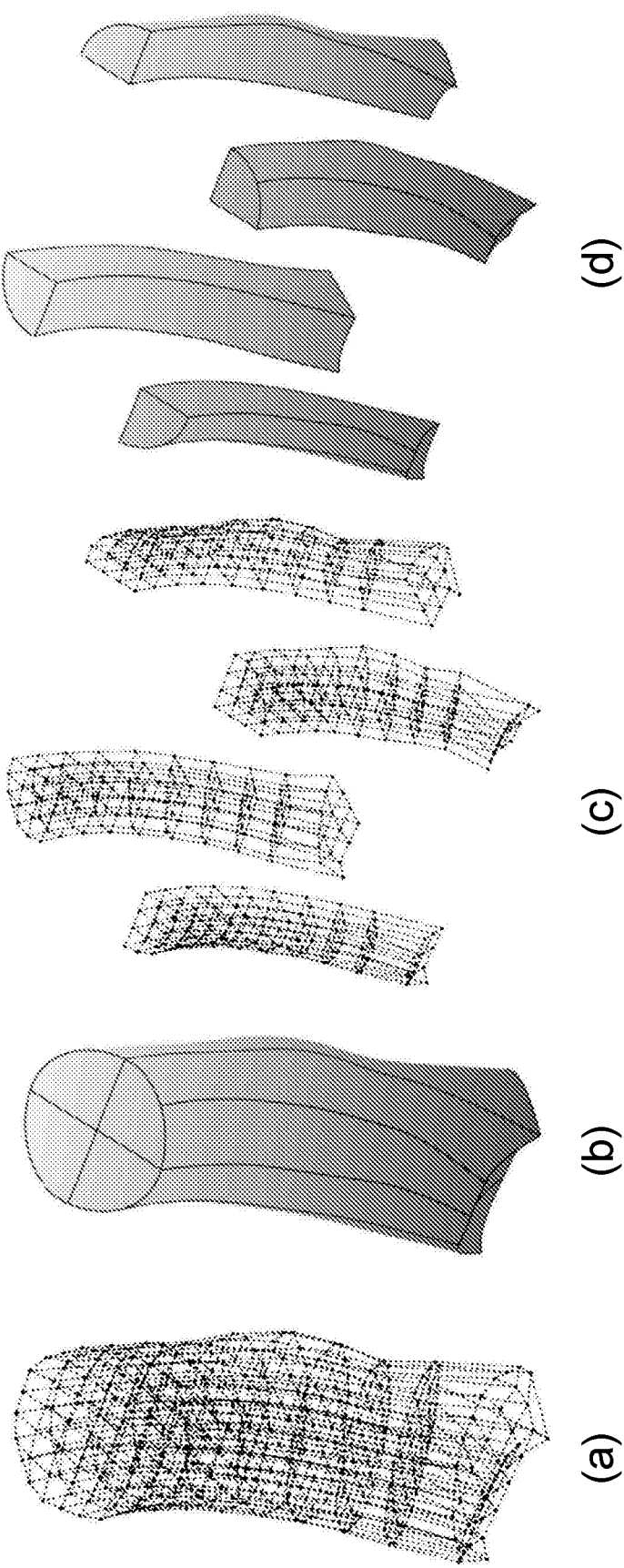

FIG. 3 schematically illustrates the luminal scaffolding of a branch of the branched organic structure. The solid scaffolding data is illustrated in an ensemble view (3a) and in an explosion view (3c). The underlying vectorial and volumetric region is illustrated in an ensemble view (3b) and in an explosion view (3d) for the entirety of the branch, which includes terminal endpoints or connecting junction with other incident branches. The quadrant-based subdivision of the luminal region is shown as a relatively simple layout for ease of illustration of the plurality of contiguous solid structures in a complex multi-compartmental structure.

Figure 4:
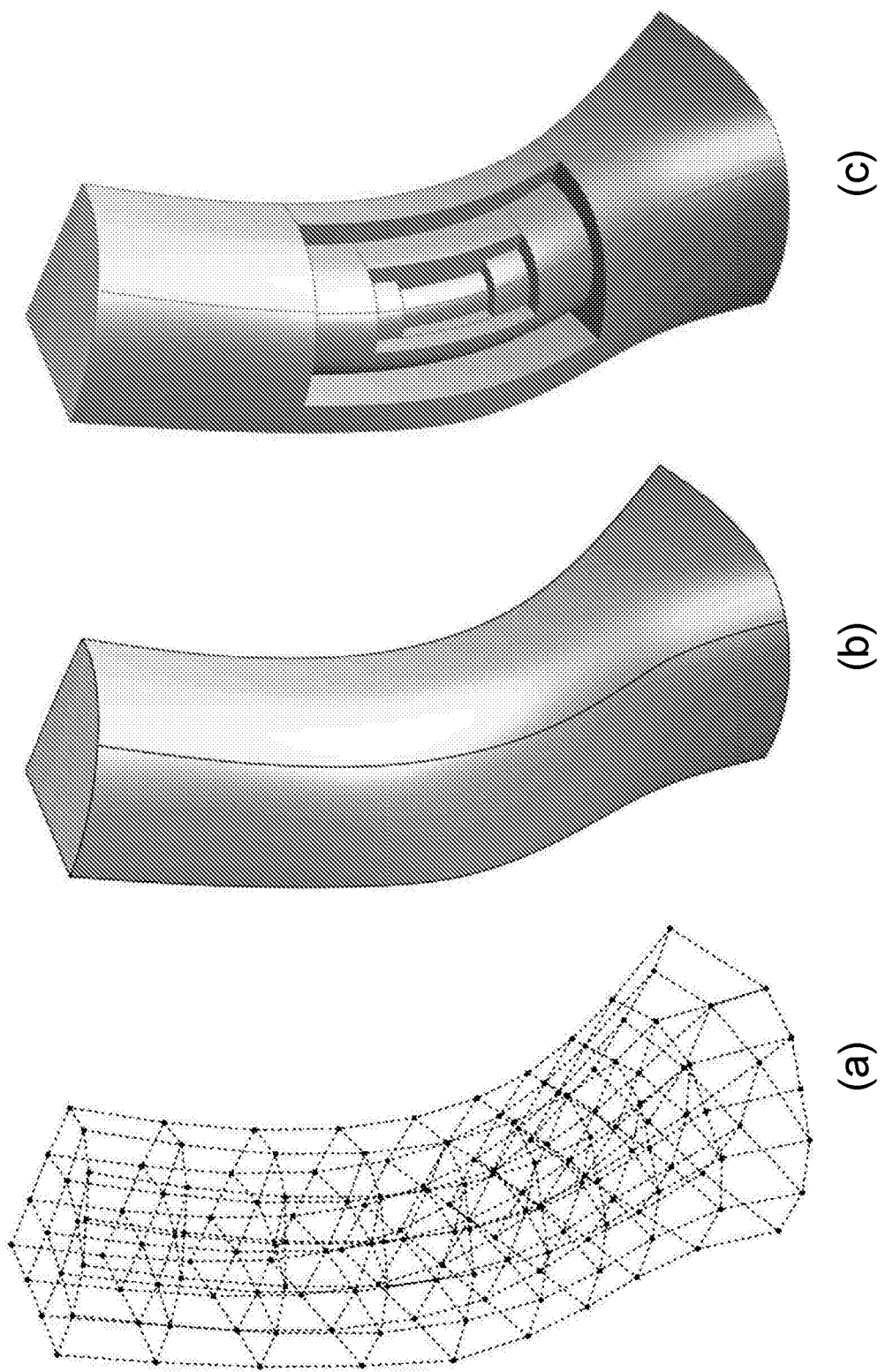

FIG. 4 schematically illustrates an individual free-form element of the conforming plurality of the scaffolding elements. The scaffolding of the free-form vectorial element (4a) comprises an innermost organised, consistent and structured lattice defined on a parametric and spatial domain. The underlying free-form volumetric element (4b) consists in a continuum with continuous physical properties and profiles as shown in the solid sectioning (4c) similarly to real-world media and materials.

Figure 5:
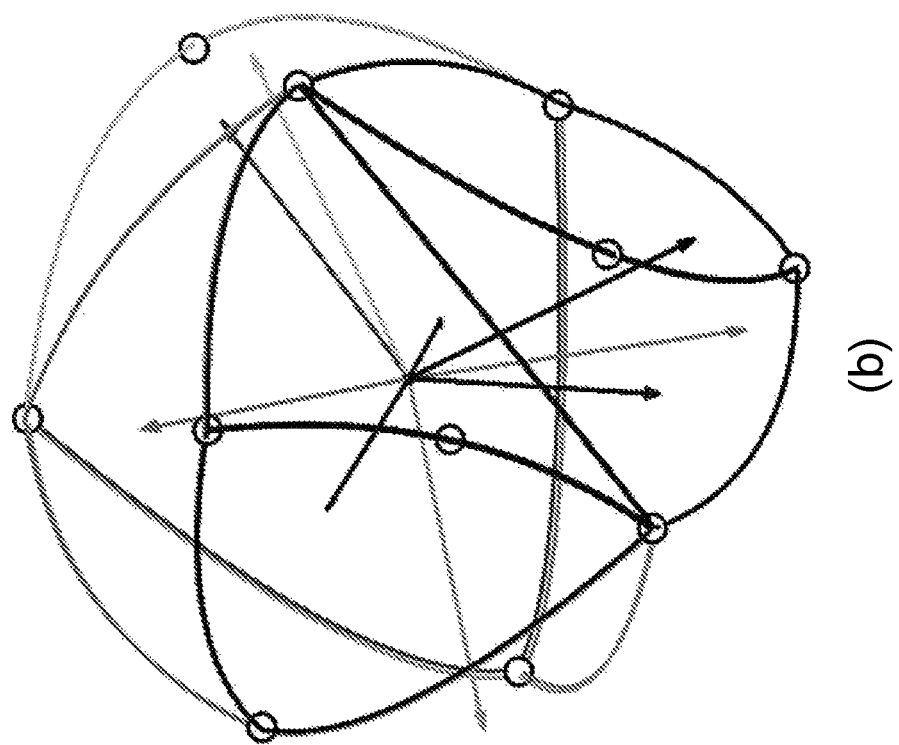
Figure 5:
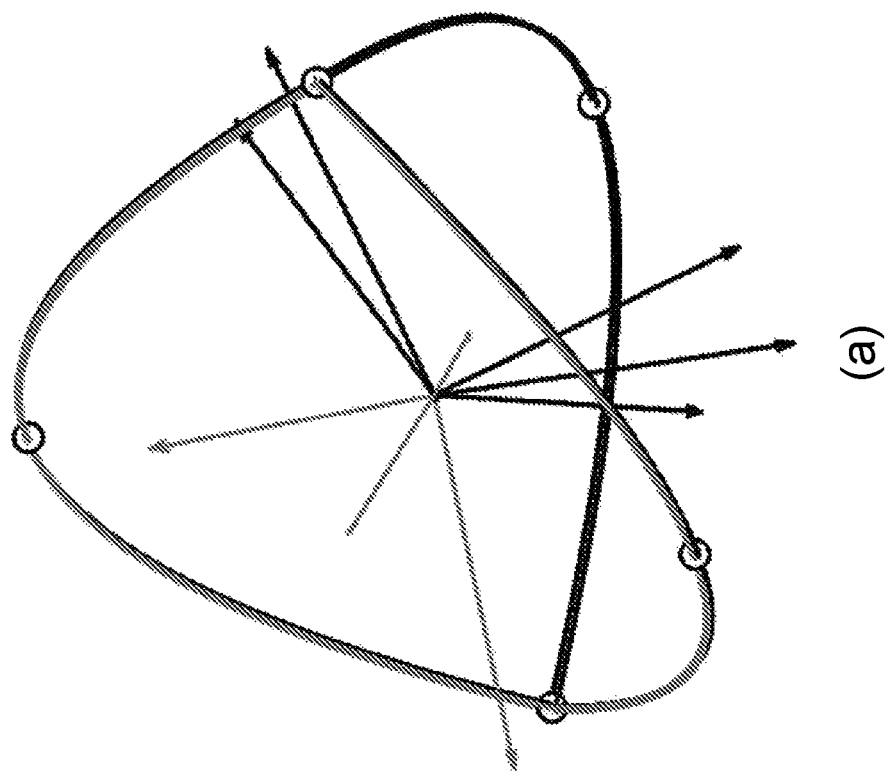
Figure 5:
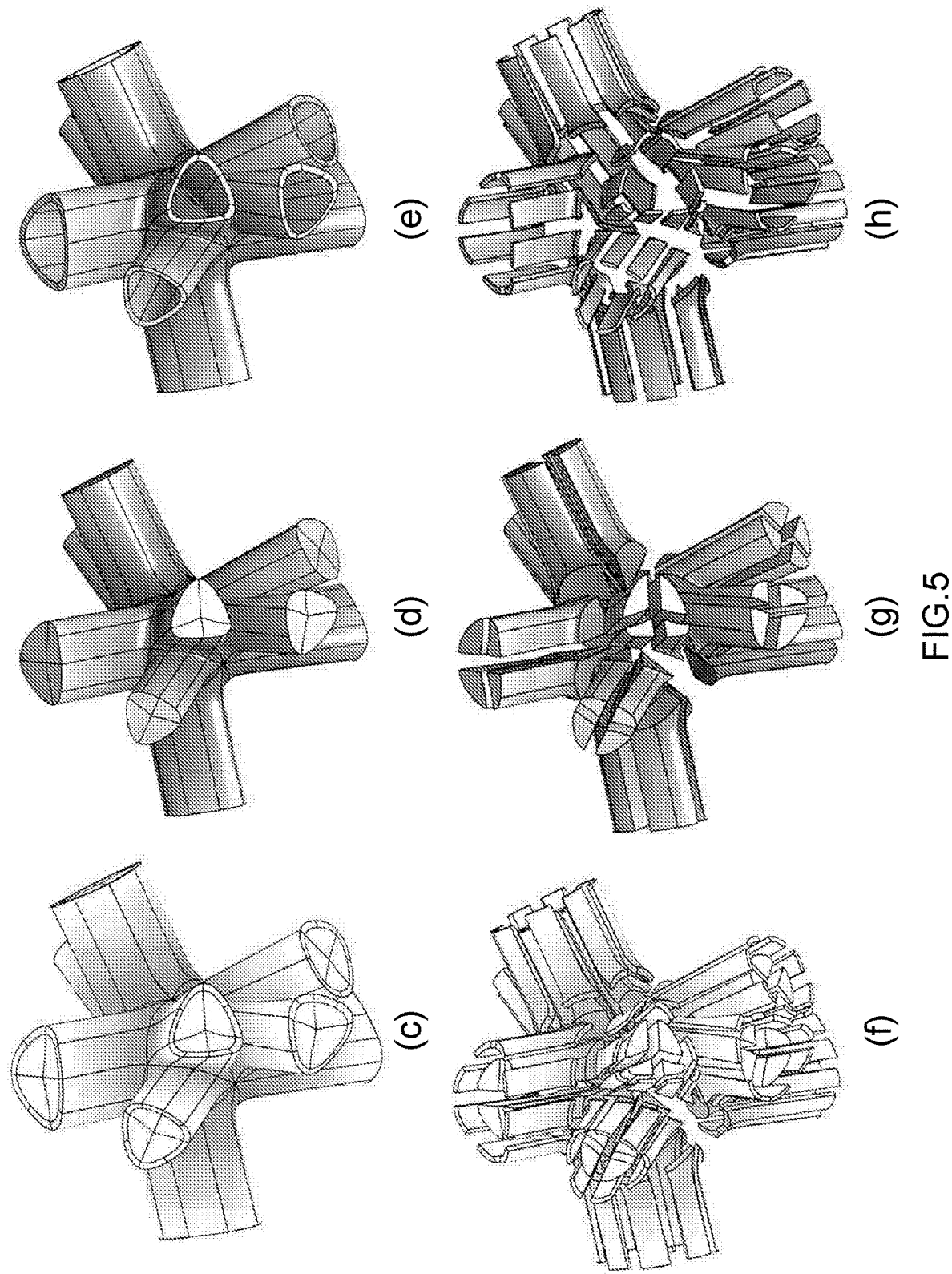

FIG. 5 schematically illustrates the junction region of an arbitrarily complex branched organic structure with higher number of incident branches and irregular shape. By way of example a junction with nine incident tubes is depicted. The associated atomic simplex (5a) is shown together with the resulting quadrilateral junction simplex (5b), where each loop surrounds an incident direction (arrows). The free-form volumetric region of a complex junction is illustrated jointly coupled (5c) and separately for both the luminal (5d) and wall (53) compartments in the ensemble view. Similarly, the jointly coupled junction (5f) and separately for both the luminal (5g) and wall (5h) compartments is schematically represented in the explosion view. The branched organic structure in FIG. 5 is shown as a relatively simple structure for ease of illustration of a busy and irregular junction, but in some implementations could be a complex structure such as a generic junction with arbitrary number of incident branches and arbitrary degree of irregularities.

Figure 6:
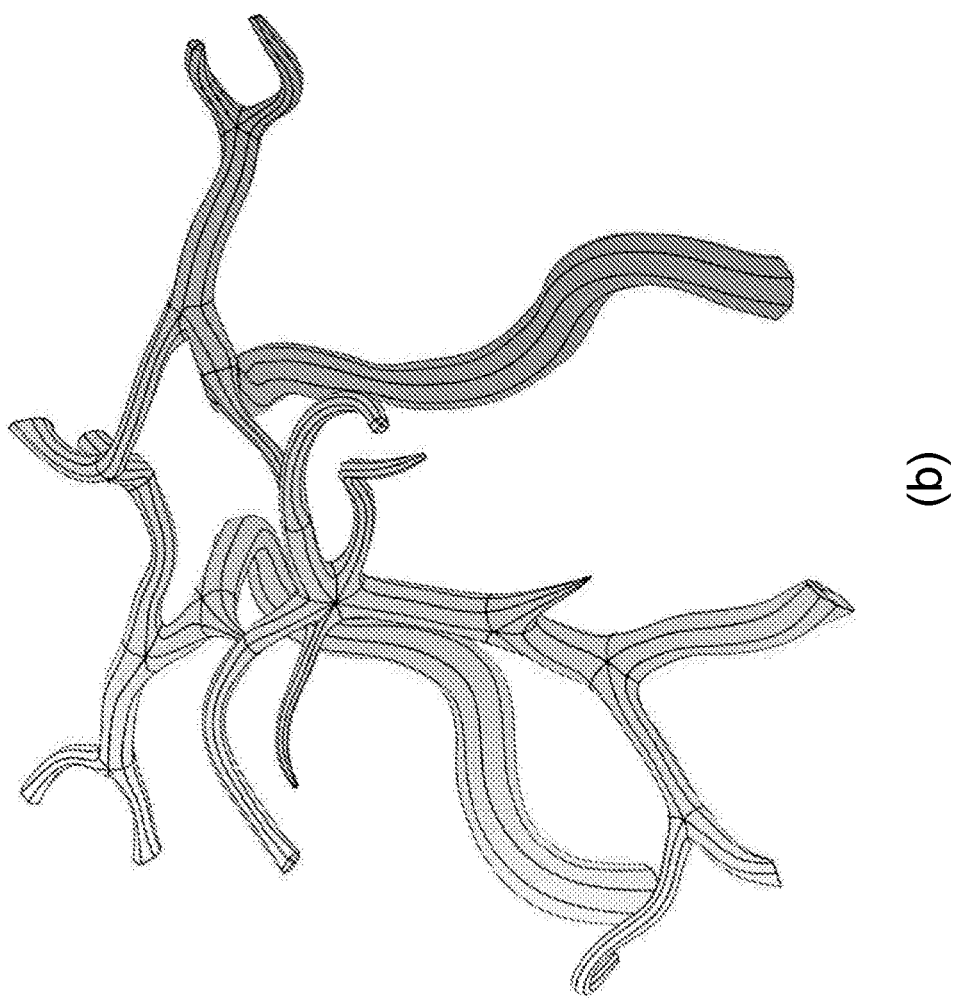
Figure 6:
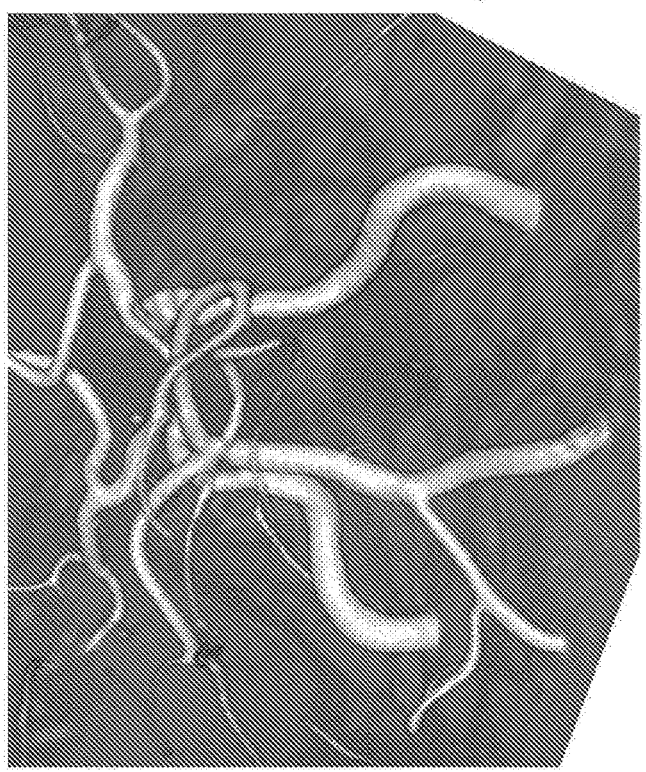
Figure 6:
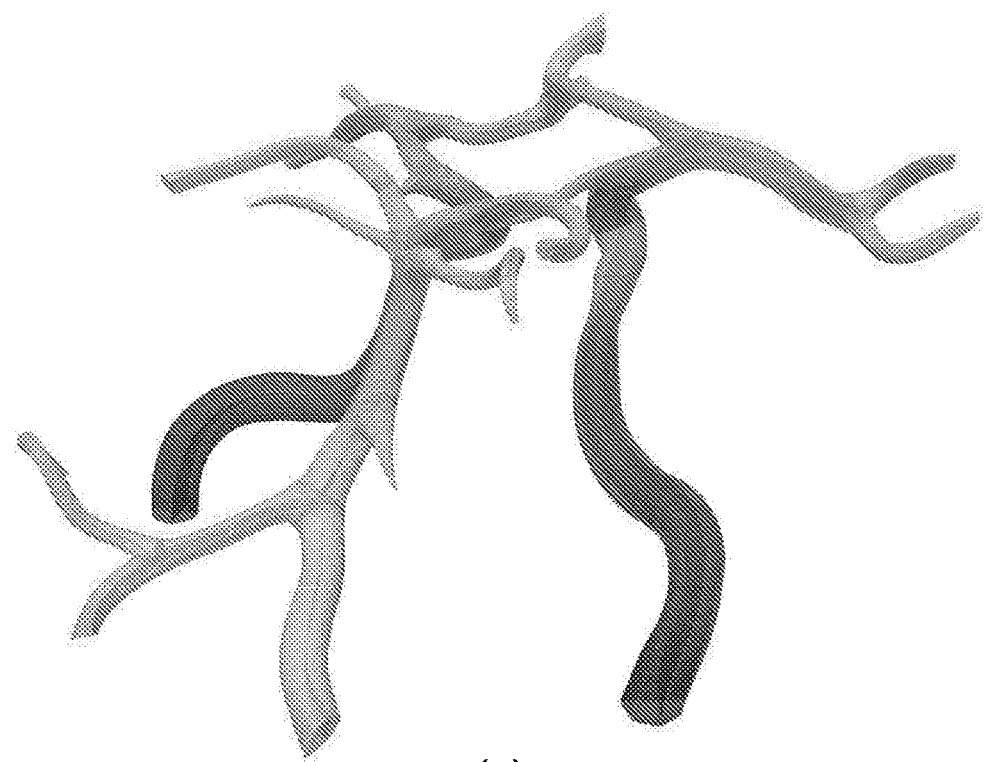
Figure 6:
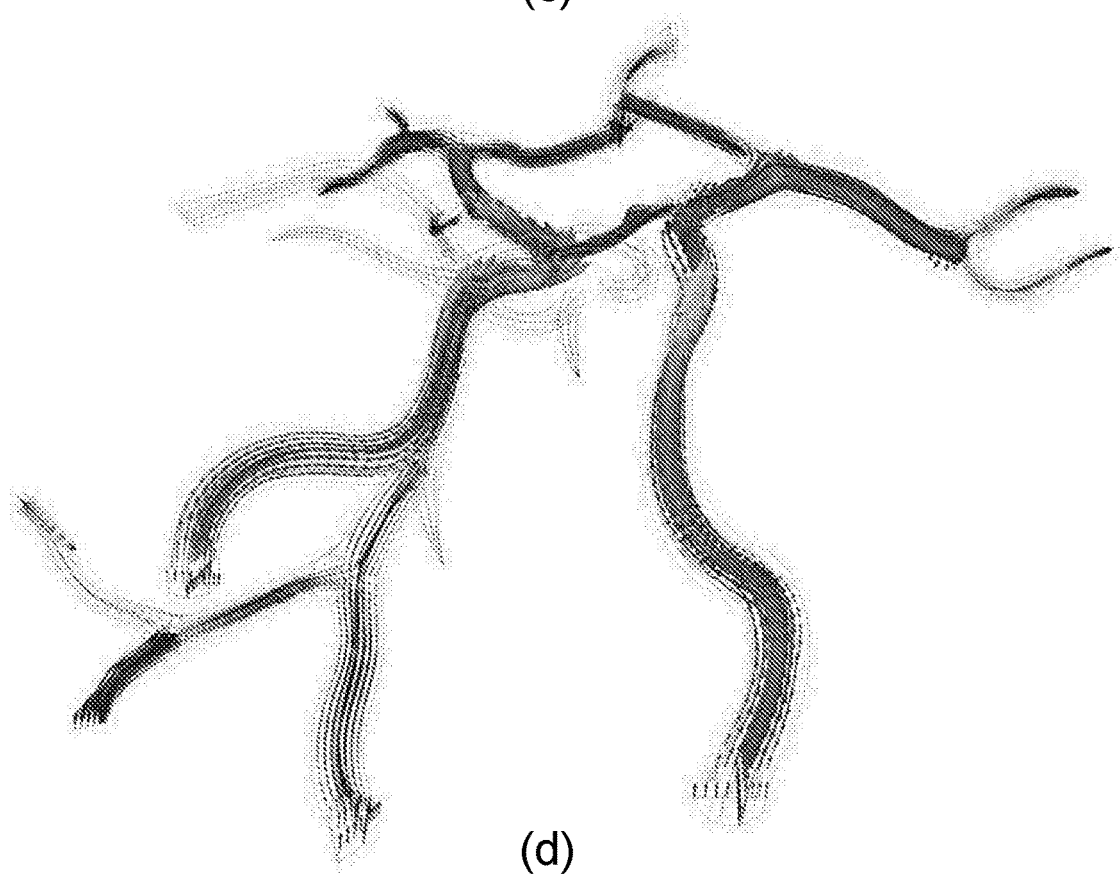

FIG. 6 schematically illustrates a complex structure such as a large vascular network 6a (for example a complete neurovascular network) as captured by an imaging apparatus. The multi-dimensional parametric representation is illustrated, for example as free-form volumetric region of a large vascular network (6b), volumetric pressure distribution (6c) and flow velocity (6d) determined with a computational simulation employing an isogeometric analysis framework. The multi-dimensional parametric representation in FIG. 6 is shown as a relatively simple illustration of one of the physical characteristics of bio-mechanical nature, but in some implementations could be a comprehensive set of physical characteristics of different nature.

Figure 7:
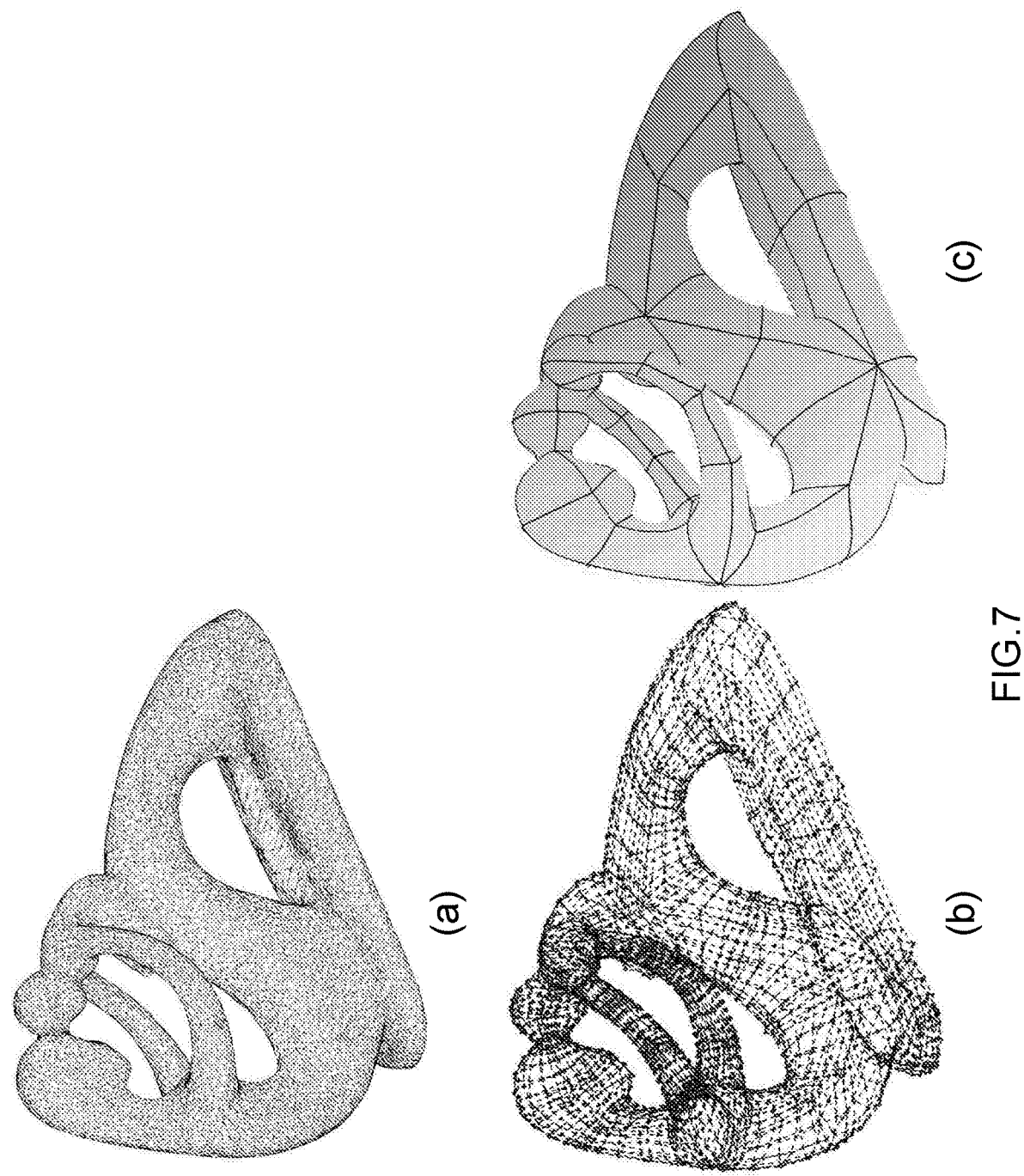
FIG. 7 depicts an example of an arbitrarily complex organic branching structure parametrised using the scaffolding data typical of a general purpose application.

FIG. 7 schematically illustrates a relatively complex structure such as a reference statue scanned with optical technologies in the form of a surface mesh (7a), typically employed in computational modelling of general purpose solid objects. The scaffolding (7b) of the general-purpose organic object is shown together with the associated free-form volumetric region (7c). The branched organic structure in FIG. 7 is shown as a relatively simple structure for ease of illustration, but in some implementations could be a complex structure with arbitrary number of incident branches and arbitrary degree of irregularities.

Figure 8:
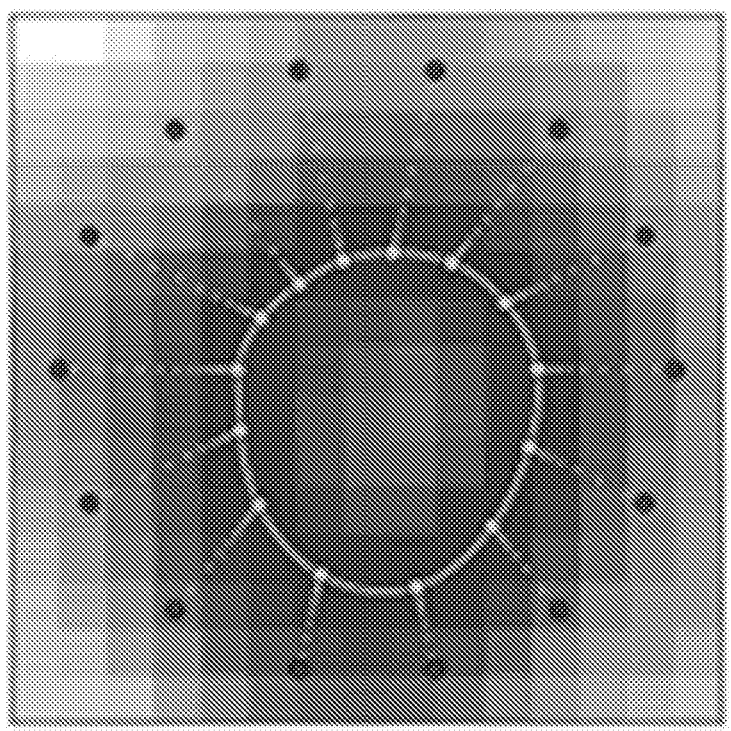
FIG. 8 depicts an initial configuration of the branching organic structure.
Figure 8:
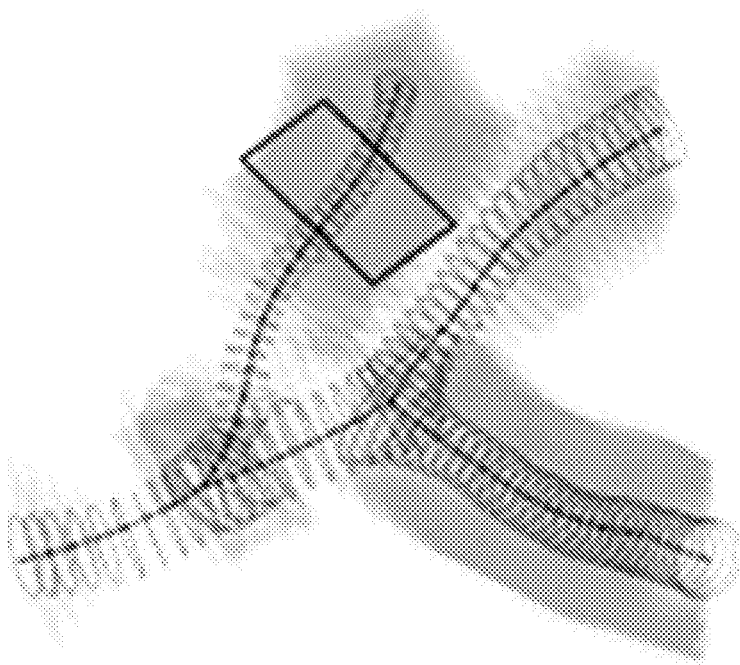

FIG. 8 schematically illustrates the configuration of the branched organic structure 2a as determined by the image processing circuitry 110 of FIG. 1. The structure is delineated as a series of rings (8*a*), which may for example be geodesic snakes (8*b*).

The multi-dimensional parametric representation in FIG. 6 may for example be used to support medical decision making, and/or for use in the creation of customised medical devices such as stents, bypass and recanalization prostheses. Furthermore, hemodynamic simulations of patient-specific vascular models based on such representations can provide quantitative diagnostic support, as well as monitoring biomarkers and predictors of pathological development and recidives. Also, in case of surgical repair, intra-operative guidance can be obtained with ad-hoc motion planning as well as with co-registered virtual delineations in an augmented-reality setup. A priori simulations of different scenarios may allow prediction of undesired side-effects induced by local perturbations on the vascular geometry and on the associated fluid dynamic measures during the intervention and in the follow-up.

A detailed example of determining a parametric configuration of a branched organic structure, including determining organised, consistent and structured scaffolding data and then determining a multi-dimensional representation of a branched organic structure will now be described. The skilled person will appreciate that this is merely an example, and other techniques are possible. This example is based on a comprehensive formulation which determines a NURBS-based solid scaffolding, accurately capturing the underlying vascular structure. The example includes a computationally efficient, but accurate, template-free parametrisation of junctions and branches from 3D data that is fully compatible with a computational simulation framework based on iso-geometric analysis (IGA). The parametrisation comprises a conforming scaffolding of solid vectorial elements, whose compact and regularised support is defined by NURBS primitives. For the vascular example, the multi-compartment of the branched organic structure comprises an inner luminal region and a contiguous outer wall region. Then an optimal continuity paradigm is devised to enforce smoothness to the parametrised branching structure, so that a global continuity condition recovers the organic profile of branching structure. While focusing on vascular analysis, the proposed methodology allows the parameterisation and simulation for any type of branching solid objects.

Graph Configuration of the Branching Structure

A branching structure is a physical-space object characterised by one or more branches, as elongated regions protruding from its body. The extent of such a branching structure can be determined e.g. by delineating or segmenting 3D volumetric images, as in clinical applications; or, alternatively, by considering the delimiting closed boundary of the structure as a polygonal surface mesh. In either case, a graph can be determined as the skeleton underlying the branching structure. Such a graph embeds both spatial and topological configurations, where the nodes correspond to junctions or terminal end-points, and the edges correspond to the elongated connecting paths underlying each branch.

Conforming Solid Scaffolding

The scaffolding is a rational partitioning of the structure's space, and it configures a set of minimal conforming elements being jointly defined over N-dimensional, physical and parametric domains.

Specifically, a solid and volumetric scaffolding is introduced to define the branching structure in a consistent domain fully compatible with an isogeometric analysis framework.

In particular, the solid scaffolding comprises an organised and structured lattice of vectorial elements, each conforming to the neighbouring ones. Such a structured lattice can be also regarded as a conforming multi-patch of minimal vectorial elements.

The conforming condition is strictly necessary for the definition of a consistent domain, and it represents the key parametric constraint and the structural criterion at the base of the solid scaffolding. The solid scaffolding builds on the graph configuration of the branching structure, as it subdivides the branching structure in a pre-defined minimal number of vectorial elements in relationship with the topology of the graph.

Vectorial Element

A vectorial element is the atomic component of the scaffolding and consists of a 3D free-form solid patch determined by NURBS primitives.

The vectorial element H(u,v,w) is defined as tensor product of three NURBS curves along three independent parametric directions (u,v,w), and has the form:

$$H(u, v, w) = \sum_{i=1}^{l_u}\sum_{j=1}^{l_v}\sum_{k=1}^{l_w} R_{i,j,k}(u, v, w) P_{i,j,k}, \text{ with} \quad (1)$$

$$R_{i,j,k}(u, v, w) = \frac{N_{i,d_u}(u) N_{j,d_v}(v) N_{k,d_w}(w) w_{i,j,k}}{\sum_{\hat{i}}^{l_u}\sum_{\hat{j}}^{l_v}\sum_{\hat{k}}^{l_w} N_{\hat{i},d_u}(u) N_{\hat{j},d_v}(v) N_{\hat{k},d_w}(w) w_{\hat{i},\hat{j},\hat{k}}}, \quad (2)$$

where $R_{i,j,k}(u,v,w)$ are the rational basis functions; $P_{i,j,k}$ are the control points of cardinality $l_u$, $l_v$, and $l_w$ in each independent parametric direction; $N_{i,d_u}(u)$, $N_{j,d_v}(v)$, and $N_{k,d_w}(w)$ are the univariate B-spline basis functions of degree $d_u$, $d_v$, and $d_w$ respectively defined and sampled on the three independent parametric directions by the respective knot vectors; and $w_{i,j,k}$ are the strictly positive weights of the rational basis functions.

Based on eq. (1), the parametrisation maps a solid tensor grid defined on the parametric domain to a physical-space, where each vectorial element can be regarded as a solid free-form cuboid. The geometrical free-form shape of the vectorial element is modulated by the 3D coordinates of the control points $P_{i,j,k}$ and by the weights $w_{i,j,k}$ of the rational basis functions. The boundary of the vectorial element comprises 6 sides of quadrilateral profile, which are oriented, in opposite pairs, to face the directions of the parametric domain. Differently from a discrete hexahedral cuboid defined by a polygonal surface mesh, the vectorial element underlies a solid portion of the space in the form of a continuum.

Conforming Condition

A pair of vectorial elements is said to be adjacent when there is at least one side in common for each element. Such pair of shared sides (or adjacent sides) are referred as interfaces, whereas the remaining sides are referred as boundaries.

The same pair of adjacent vectorial elements is also said to be conforming when all the interfaces are conforming, i.e. the parametrisation of each pair of adjacent sides is matching.

In other words, for each interface, all the control points, as well as, all the knot vectors and all the weights of the rational basis functions and the degrees of the associated univariate B-spline basis functions defining the sides of the adjacent sides must coincide, up to a different orientation of elements in the parametric domain.

With this definition of a conforming solid scaffolding, all the adjacent elements in the lattice jointly meet the above conforming condition.

Luminal and Wall Scaffoldings

The scaffolding builds on the branching structure graph, where a higher density of branches and greater complexity of the branching pattern leads to the use of an increasing number of elements to minimally parametrise the underlying spatial regions.

In the following, a luminal scaffolding is introduced and a wall scaffolding is derived as an extension thereof. For the luminal scaffolding, the minimal number of vectorial elements is generalised considering a generic branching structure, whose graph represents a network of arbitrary branching pattern. Then, the arrangement of the elements and the conforming constraints are provided for the formulation of scaffoldings.

Luminal Scaffolding

The luminal scaffolding comprises the organised set of vectorial elements filling the innermost space of a branching structure, e.g. the fluid region as in a set of tubes or connected chambers, or the volumetric space occupied by a solid object.

Minimal Vectorial Elements

The scaffolding deterministically subdivides the branching structure in a pre-defined number of vectorial elements based on the topology of the graph.

By way of example and independently from the geometric regularity of the luminal structure, the associated luminal scaffolding of a solid cylinder or an ellipsoid requires, in this example, at least one vectorial element; in this case the graph consists of a two terminal nodes connected by one edge. The luminal scaffolding of a bifurcating tube (e.g. Y- or T-shape branching pattern) requires, in this example, at least 2 vectorial elements per branch; in this case the graph is an un-rooted, undirected binary tree with 3 edges and 4 nodes (3 terminal end-points and 1 junction).

In case of a generic graph with arbitrary branching pattern, the luminal scaffolding requires, in this example, a minimal number of 4 vectorial elements per branch, assuming branches connect with generic n-way-junctions. In the general case, the number of vectorial elements of the luminal scaffolding is directly proportional to the number of branches.

Spatial Arrangement and Adjacency

Considering a generic graph with arbitrary branching pattern, the luminal scaffolding arranges each branch in 4 organised cross-sectional quadrants, each of which accounts for an individual vectorial element. Such topological organisation results in 4 adjacent vectorial elements elongated along the longitudinal direction of the branch: starting from a junction towards the terminal endpoint, otherwise towards another junction.

Assuming the parametric direction w mapping the longitudinal direction along the branch, each element is adjacent to other two elements of the same branch along one of its cross-sectional sides. In particular, two interfaces are determined for each vectorial element in the correspondence of the interior part of the quadrant: one interface facing u and the other interface facing v respectively. The remaining pair of sides, i.e. the boundaries, determines the exterior part of the quadrant: respectively, one boundary side facing u and another boundary side facing v, opposite to the interfaces. The boundaries do not share any side in common with any other element of the branch and of the whole luminal scaffolding, as they define a pseudo-circumferential profile, relative to the elongation of the branch.

In the correspondence of a terminal branch, each element of the branch scaffolding terminates with a boundary side facing the longitudinal direction w.

Conversely, in the correspondence of a junction, each vectorial element determines an interface with another adjacent element of a neighbouring incident branch. The scaffolding configuration of such set of interfaces facing the parametric direction w at the junction is defined by a quadrilateral junction simplex.

Quadrilateral Junction Simplex

In a generic junction, all the vectorial elements of each incident branch adjacently shall meet in the neighbourhood of the junction node. This determines a structured set of interfaces, all facing the w parametric direction, where each interface (as any other side) of the vectorial elements shall be configured with a quadrilateral profile.

Such structural requirements are met by introducing a rational partitioning of the junction's space: the quadrilateral junction simplex.

The quadrilateral junction simplex Q is an interfacing configuration of the scaffolding and its atomic form represents a bifurcation. The topology of the atomic simplex $Q^a$ accounts for a total of 5 nodes and 6 edges.

Furthermore, $Q^a$ is configured in 3 loops, each comprising 4 nodes and 4 edges, which are jointly connected by 2 common nodes, i.e. the initial extraordinary vertices of the atomic simplex. The associated spatial embedding of the atomic simplex delimits the interfacing cross-sectional areas of three incident branches, where each loop of $Q^a$ surrounds the incidental direction of the branch with 4 connecting arcs.

In this form, each loop defines a quadrilateral profile, and each arc of each loop underlies a quadrant. The geometrical embedding of an atomic simplex $Q^a$ is formulated by considering the directions of the incident branches as three non-coincident unit vectors, centred at the origin of a 3D reference system.

In the general form, the quadrilateral junction simplex Q of a junction with n incident branches topologically consists in an adjacent stack of multiple atomic simplexes, where each pair of adjacent atomic simplexes mutually share a common loop.

In a physical-space embedding, such topological composition is equivalent to a cascade of spatial bisections of an initial atomic simplex $Q^a$, which first considers three principal incidental directions of the n-way-junction. In this case, the total number of required bisections equals to n−3, for n incident branches. In detail, at each bisection, the initial parent loop is split into a pair of child loops following a binary spatial partition.

Each loop bisection is geometrically determined by connecting any alternating pair of vertices of the parent loop with an arc, and by splitting the connecting arc at the midpoint.

This binary spatial partition is iterated for the newly generated child loops until convergence, where each child loop surrounds every incidental direction of the n-way-junction.

Note that, following such bisection strategy, each loop of the simplex keeps a quadrilateral profile. The resulting spatial configuration of Q is data-driven and is determined upon the incidental directions and sizes of the branches at the junction. Each bisection is based on maximising the volumetric partition for each incident branch.

Lastly, from the resulting simplex Q, a set of interfacing quadrants is eventually obtained for each loop, by connecting first all the vertices of the simplex with its centroid, then by splitting each arc of each loop at the midpoint.

The formulation of the quadrilateral junction simplex provides a consistent quadrant-based configuration in agreement with the construction of the scaffolding, and determines a geometrical embedding of the associated vectorial elements.

In particular, for each interface facing the parametric direction w, the associated quadrant-based subset of the simplex vertices coincides with the subset of control points as in eq. (1).

Conforming Constraints

The conforming condition of the scaffolding introduces a certain dependency among the parameters of each vectorial element in the lattice.

In line with the above construction, the parametric components along (u,v) directions are equivalent, i.e. the the univariate basis functions degrees $d_u=d_v$ in eq. (2), as well as the knot vectors, and the cardinality of control points $l_u=l_v$ as in eq. (1) and eq. (2), respectively for each vectorial element.

Geometrically, the control points coordinates associated to each adjacent side of any pair of conforming vectorial elements coincide as well.

Each element of the luminal scaffolding has independent parametric components along w, i.e. arbitrary degree $d_w$, arbitrary spacing of the knot vector and arbitrary cardinality of control points $l_w$.

Wall Scaffolding

The wall scaffolding comprises the organised set of vectorial elements occupying the exterior, hollow, volumetric space, which encloses the luminal region, e.g. a set of connecting hollow pipes, or communicating hollow chambers made of thin or thick walls, otherwise a partial or complete volumetric shell of a solid object.

The wall scaffolding can be considered either separately, or additionally coupled together with the luminal scaffolding.

Properties of the Wall Scaffolding

Similarly to the luminal scaffolding, the minimal number of vectorial elements of the wall scaffolding depends on the complexity of the underlying structure. In the generic case, the number of vectorial elements of the wall scaffolding are directly proportional to the number of boundary sides of the associated luminal scaffolding, and the construction of the wall scaffolding can be indeed considered as a conforming extrusion of the luminal scaffolding boundaries. As such, it inherits similar adjacency properties and the same conforming constraints of the luminal scaffolding, however, the wall scaffolding topologically subdivides the elongated region of each branch with 8 adjacent vectorial elements cross-sectionally configured in an octagonal ring.

Fitting Spatial Geometries

The delineation of a branching organic structure is obtained by segmenting 3D volumetric images, e.g. angiographies in clinical applications, or by evaluating the exterior surface of the branching organic structure captured with optical technologies, such as structured lights.

The ultimate goal is fitting the scaffolding geometric parameters (i.e. the control points coordinates) onto the spatial embedding of the segmented structure.

In the following, by way of example, the segmentation of a representative branching biological structure (network of vessels) is described using geodesic snakes (active contours) to recover a 3D points cloud of the branching structure.

Considering a clinical 3D angiography employed in neurovascular applications, and a set of associated connected centrelines or skeleton, the segmentation of the underlying vessels is obtained by separately processing each branch of the connected vessels.

In particular, each branch of the angiographic images is first re-sampled with a curve-to-planar reformatting projection into a stack of cross-sectional slices orthogonal to the associated centreline or skeleton.

Then, a pair of antagonist level-sets propagate on the stack of cross-sectional slices approximating a front-wave motion in an isotropic medium.

This is numerically solved with a Fast Marching algorithm, and the resulting level-sets determine an implicit boundary potential in the correspondence of the vascular border.

An internal level-set models the diffusion within the branching structure, propagating first along the lumen, towards the vessel wall. Conversely, an external level-set models the opposing and containing effect of external structures surrounding the vascular tube, propagating from the surrounding space towards the innermost luminal part.

The implicit boundary potential leverages the monotonic profiles of the antagonist level-sets, so that it implicitly encodes the spatial locus of the competing frontier, with local minima in the neighbourhood of the vascular border.

Lastly, cross-sectional geodesic active contours radially evolve from an initial circular shape towards the local minima of the potential enclosing the lumen of the vessel in a closed curve. This is iteratively obtained, as the snakes' evolution follows a gradient descent towards the valleys of the potential. An integral energy along the snake is minimised at convergence.

The geodesic snakes of each vascular branch determine an unorganised set of 3D points by inverting the curve-to-planar mapping. They segment the branching structure and surrounds the scaffolding previously built on the associated graph. For each vectorial element and for each simplex of the scaffolding, the coordinates of the associated control points coincide with the spatial coordinates of the inner skeleton at the innermost part; whereas the outer control points coordinates are determined by minimising a least-square fit along the quadrant-based scaffolding directions towards the 3D points cloud of the geodesic snakes.

Smoothing Paradigm

The scaffolding defines a conforming lattice of vectorial elements characterised by positional continuity ($G^0$), i.e. the elements are adjacent one another, and the parametric components are consistent at the interfaces.

However, this may result in geometrical discontinuities, which produce creases and sharp edges in the correspondence of contiguous sides.

In order to achieve a smooth outline typical of an organic branching structure, a global and iterative strategy can optimise for higher geometrical continuity among the set of adjacent vectorial elements. In particular, such a smoothing paradigm adjusts the geometrical curvature of contiguous sides belonging to adjacent vectorial elements of the scaffolding.

In detail, each pair of adjacent elements shares two contiguous sides ($S^{(A)}$, $S^{(B)}$) facing the same parametric direction, and each pair of contiguous sides is delimited by a pair of coinciding curvilinear profiles in either u, v, or w direction.

In the following example, and without loss of generality, the geometrical $G^2$-continuous condition is given for a pair of contiguous sides ($S^{(A)}$, $S^{(B)}$), both defined over a parametric domain of tuple (u,v).

In this case, each side is sharing a common curvilinear profile along a parametric direction, e.g. u, therefore, the geometrical $G^2$-continuous condition along u can be formulated as $$\begin{cases} P_{i,l_v}^{(A)} = P_{i,1}^{(B)} \\ \dfrac{P_{i,l_v}^{(A)} - P_{i,l_v-1}^{(A)}}{l_v^{(B)}} = g\dfrac{P_{i,2}^{(B)} - P_{i,1}^{(B)}}{l_v^{(A)}} \\ \left(\left((l_v^{(A)})^2 - l_v^{(A)}\right)\left(P_{i,l_v}^{(A)} - P_{i,l_v-1}^{(A)}\right) + + \left(l_v^{(A)} - (l_v^{(A)})^2\right)\left(P_{i,l_v-1}^{(A)} - P_{i,l_v-2}^{(A)}\right)\right) == \\ \quad g^2\left[\left((l_v^{(B)})^2 - l_v^{(B)}\right)\left(P_{i,1}^{(B)} - P_{i,2}^{(B)}\right) + + \left(l_v^{(B)} - (l_v^{(B)})^2\right)\left(P_{i,2}^{(B)} - P_{i,3}^{(B)}\right)\right] \\ \text{with } i = 1, 2, \dots, l_u^{(A)} = l_u^{(B)} \end{cases}$$

where P are the control points coordinates, and g is a real positive scalar. The continuity conditions are met by solving the above system in and opportunely modifying the control points coordinates of the contiguous sides of adjacent vectorial elements. The conditions enforce the pair of sides $(S^{(A)}, S^{(B)})$ are positionally adjacent, i.e. $G^0$, have the same tangent, i.e. $G^1$, and the second derivatives are equal, i.e. $G^2$, at the common curvilinear profile along the parametric direction u. The formulation can be generalised and applied to any pair of sides defined over an arbitrary tuple of parametric directions.

After determining all the contiguous pairs of sides, each pair is iteratively smoothed until convergence, achieving nearly $G^2$-continuity on the global lattice of vectorial elements. Convergence is achieved for a finite tolerance factor, evaluated on the difference between normal directions of the contiguous pair of sides at the delimiting common profile.

Discussion of the Above-Described Example

Above is described an automated NURBS parametrisation of branching organic structures that smoothly and compactly model elongated geometries for simulations using an isogeometric analysis framework. The end-to-end paradigm recovers accurate profiles and constructs an implicit spatial partitioning of the structures, concurrently optimising global continuity condition.

In particular, junctions are smoothly recovered with an efficient template-free design, which reported consistent differential continuity at the interfaces, even for strongly irregular geometries. The scaffolding parametrisation represents a compact trade-off between anatomical detail and construction complexity.

Qualitative results on clinical angiographic data support the translation of the proposed methodologies towards automated hemodynamic and biomechanical hyper-elastic simulations within an IGA framework.

This allows simulations in cardio- and neurovascular scenarios, where the vascular graft geometry optimally modifies for the purpose of improving hemodynamic outcomes, and where manufacturers can predict the patient-specific device performance prior to deployment.

Beyond the biomedical imprint, the above-described NURBS-based parametrisation can transversally extend to seamlessly integrating CAD-compatible geometries with numeric IGA simulations (e.g. shape-optimisation, thermal and strength analysis, rigid body dynamics and computational simulations) in multiple settings such as organic architecture, mechanical engineering and industrial design.

Through use of the above described techniques, it will be appreciated that multi-dimensional representations of a branched organic structure can be efficiently and accurately determined.

Methods described herein may be performed in hardware and/or software. Such hardware may be a general-purpose processor, or a more specific unit such as an application-specific integrated circuit or a field-programmable gate array.

Although illustrative examples of the invention have been described in detail herein with reference to the accompanying drawings, it is to be understood that the invention is not limited to those precise examples, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Examples of the present disclosure are set out in the following numbered clauses:

1. An apparatus comprising:
    input circuitry configured to acquire imaging data corresponding to a branched biological structure; and
    image processing circuitry configured to:
        extract, from the imaging data, a configuration of the branched biological structure;
        determine scaffolding data indicative of the configuration of the branched biological structure; and
        determine, based on the scaffolding data, a multi-dimensional geometric representation of the branched biological structure.
2. An apparatus according to clause 1, wherein the scaffolding data comprises a plurality of polygons associated with a surface of the branched biological structure, at least one of said polygons optionally being a curvilinear non-planar polygon.
3. An apparatus according to clause 2, wherein determining the scaffolding data by the image processing circuitry comprises imposing at least one of a continuity constraint and a smoothness constraint associated with adjacent polygons of said plurality of polygons.
4. An apparatus according to any preceding clause, wherein the multi-dimensional geometric representation is a vector representation of the branched biological structure.
5. An apparatus according to any preceding clause, wherein the scaffolding data comprises Non-Uniform Rational B-Splines, NURBS, primitives corresponding to branches of the branched biological structure and corresponding to connections between said branches of the branched biological structure.
6. An apparatus according to clause 5, wherein said NURBS primitives comprise at least one of:
    a curvilinear segment;
    a quadrilateral surface patch; and
    a hexahedral volume solid.
7. An apparatus according to clause 5 or clause 6, wherein the image processing circuitry is configured to, as part of determining the scaffolding data:
    determine, for each said branch, at least one geometrical property of that branch; and
    determine, for each said connection, at least one geometrical property of that connection.
8. An apparatus according to clause 7, wherein:
    said geometrical property of each said branch comprises at least one of:
        a length of that branch; and
        a spatial location of that branch, and/or
    said geometrical property of each said connection comprises:
        a number of incident branches of that connection.

9. An apparatus according to any preceding clause, wherein the image processing circuitry is configured to detect, based on the multi-dimensional geometric representation, a biological characteristic of the branched biological structure.

10. An apparatus according to clause 9, wherein the image processing circuitry is configured to, as part of detecting the biological characteristic, determine a distribution of at least one biomechanical property within the branched biological structure.

11. An apparatus according to clause 10, wherein said at least one biomechanical property comprises at least one of:
fluid pressure; and
fluid flow.

12. An apparatus according to clause 10 or clause 11, wherein the image processing circuitry is configured to determine said distribution of said at least one fluid property by performing computational fluid dynamic modelling based on the multi-dimensional geometric representation of the branched biological structure.

13. An apparatus according to any preceding clause, wherein the multi-dimensional representation is a three-dimensional representation of the branched biological structure.

14. An apparatus according to any preceding clause, wherein the multi-dimensional representation comprises:
a multi-dimensional representation of an interior surface of the branched biological structure; and
a multi-dimensional representation of an exterior surface of the branched biological structure.

15. An apparatus according to any preceding clause, wherein the image processing circuitry is configured to, as part of determining the multi-dimensional geometric representation of the branched biological structure:
determine, based on the scaffolding data, a plurality of surface elements associated with at least one connection between branches of the branched biological structure;
determine, based on said plurality of surface elements, a volume element associated with said at least one connection.

16. An apparatus according to clause 15, wherein the image processing circuitry is configured to, as part of determining the multi-dimensional geometric representation of the branched biological structure:
determine a plurality of said volume elements, each said volume element being associated with a connection between branches of the biological structure; and
determine links between volume elements of said plurality, whereby to determine the multi-dimensional geometric representation as a branching model of the branched biological structure.

17. An apparatus according to any preceding clause, wherein the branched biological structure is a tubular biological structure comprising a fluid.

18. An apparatus according to clause 17, wherein said tubular structure is a network of blood vessels.

19. An apparatus according to clause 18, wherein said network of blood vessels is associated with a biological organ, said biological organ optionally being one of:
a brain;
a kidney; or
an eye.

20. An apparatus according to clause 19, wherein said network of blood vessels is a substantially complete neurovascular network.

21. An apparatus according to clause 17, wherein said tubular structure is a pulmonary structure.

22. An apparatus according to any preceding clause, wherein the imaging data is an angiographic image.

23. A method comprising:
acquiring imaging data corresponding to a branched biological structure;
extracting, from the imaging data, a configuration of the branched biological structure;
determining scaffolding data indicative of the configuration of the biological structure;
determining, based on the scaffolding data, a multi-dimensional geometric representation of the branched biological structure.

24. A computer-readable medium comprising computer-implementable instructions for causing a computer to become configured as the apparatus of any of clauses 1 to 22, or to become configured to carry out the method of clause 23.

The invention claimed is:

1. An apparatus comprising:
input circuitry configured to acquire imaging data corresponding to a branched organic structure; and
image processing circuitry configured to:
determine, from the imaging data, a parametric configuration of the branched organic structure comprising solid and volumetric scaffolding data indicative of the branched organic structure, wherein:
the solid and volumetric scaffolding data comprises a layout of a pre-determined plurality of free-form conforming vectorial elements associated with branches, and connections between said branches, of the branched organic structure; and
said free-form vectorial elements of the solid and volumetric scaffolding:
have a layout of said free-form vectorial elements in the form of a lattice defined by a parametric three-dimensional tensor product along each physical dimension of said free-form vectorial element; and
are associated with corresponding solid and volumetric regions of the branched organic structure; and
determine, based on the scaffolding data, a multi-dimensional parametric representation of the branched organic structure.

2. An apparatus according to claim 1, wherein the image processing circuitry is configured to determine the multi-dimensional parametric representation by performing a computational simulation employing an isogeometric analysis framework.

3. An apparatus according to claim 1, wherein determining the solid and volumetric scaffolding data comprises imposing at least one of a continuity constraint and a smoothness constraint associated with fully or partially adjacent conforming elements of said plurality of free-form vectorial elements.

4. An apparatus according to claim 1, wherein:
the parametric configuration is a vectorial representation in the form of a continuum; and
the multi-dimensional parametric representation of the branched organic structure is a vectorial representation in the form of a continuum.

5. An apparatus according to claim 1, wherein the solid and volumetric scaffolding data comprises at least one of:
Non-Uniform Rational B-Splines, NURBS;

hierarchical NURBS; and

Trimmed-NURBS (T-NURBS)

as vector primitives, corresponding to branches of the branched organic structure and corresponding to connections between said branches of the branched organic structure.

6. An apparatus according to claim 5, wherein said vector primitives comprise at least one of:

a curvilinear patch;

a quadrilateral patch; and a cuboid patch.

7. An apparatus according to claim 5, wherein the data processing circuitry is configured to, as part of determining the solid and volumetric scaffolding data:

determine, for each said branch, at least one parametric property of that branch; and determine, for each said connection, at least one parametric property of that connection.

8. An apparatus according to claim 7, wherein:

said parametric property of each branch comprises at least one of:

a length of that branch; and a spatial location of that branch, and/or said parametric property of each said connection comprises:

a number of incident branches of that connection.

9. An apparatus according to claim 1, wherein the data processing circuitry is configured to detect, based on the multi-dimensional parametric representation, a physical characteristic of at least a part of the branched organic structure.

10. An apparatus according to claim 9, wherein the physical characteristic is a physical characteristic of a medium of the branched organic structure.

11. An apparatus according to claim 9, wherein the data processing circuitry is configured to, as part of detecting the physical characteristic and measurement, determine a distribution of at least one physical quantity within the branched organic structure.

12. An apparatus according to claim 11, wherein the data processing circuitry is configured to determine said distribution of said at least one physical quantity of the medium by performing computational simulations and computational modelling based on the multi-dimensional parametric representation of the branched organic structure.

13. An apparatus according to claim 1, wherein the multi-dimensional parametric representation comprises a multi-layer, and/or multi-compartmental, representation of the branched organic structure.

14. An apparatus according to claim 13, wherein the multi-layer and/or multi-compartmental representation of the multi-dimensional parametric representation comprises:

a multi-dimensional parametric representation of a relative interior interfacing solid region of the branched organic structure; and a multi-dimensional representation of a relative exterior interfacing solid region of the branched organic structure.

15. An apparatus according to claim 1, wherein the data processing circuitry is configured to, as part of determining the multi-dimensional parametric representation of the branched organic structure:

determine, based on the solid and volumetric scaffolding data, a plurality of conforming solid and volumetric elements associated with at least one connection between branches of the branched solid structure; and determine, based on said plurality of conforming solid and volumetric elements, a solid and volumetric element associated with said at least one connection.

16. An apparatus according to claim 1, wherein the image processing circuitry is configured to, as part of determining the multi-dimensional parametric representation of the branched organic structure:

determine a plurality of said conforming solid and volumetric elements, each said solid and volumetric element being associated with a connection between branches of the solid structure;

determine at least one link between elements of said plurality; and based on said elements and/or said links, determine the multi-dimensional parametric representation as a solid connected model of the branched organic structure in the form of a continuum.

17. A non-transitory computer-readable medium comprising computer-implementable instructions for causing a processor to become configured as the apparatus of claim 1.

18. A method comprising:

acquiring imaging data corresponding to a branched organic structure;

determining, from the imaging data, a parametric configuration of the branched organic structure comprising solid and volumetric scaffolding data indicative of the branched organic structure, wherein:

the solid and volumetric scaffolding data comprises a layout of a pre-determined plurality of free-form conforming vectorial elements associated with branches, and connections between said branches, of the branched organic structure; and said free-form vectorial elements of the solid and volumetric scaffolding:

have a layout of said free-form vectorial elements in the form of a lattice defined by a parametric three-dimensional tensor product along each physical dimension of said free-form vectorial element; and are associated with corresponding solid and volumetric regions of the branched organic structure; and determining, based on the scaffolding data, a multi-dimensional parametric representation of the branched organic structure.

* * * * *